Nov. 3, 1953

H. F. SILVER 2,658,010

DOUBLE ROTARY DIFFUSION BATTERY

Filed Feb. 7, 1950

INVENTOR.
Harold F. Silver

BY

ATTORNEY

Nov. 3, 1953

H. F. SILVER 2,658,010

DOUBLE ROTARY DIFFUSION BATTERY

Filed Feb. 7, 1950

INVENTOR.
Harold F. Silver
BY
ATTORNEY

INVENTOR.
Harold F. Silver
BY
ATTORNEY

Nov. 3, 1953

H. F. SILVER 2,658,010

DOUBLE ROTARY DIFFUSION BATTERY

Filed Feb. 7, 1950

*INVENTOR.*
Harold F. Silver

BY

*N. A. McGrew*

ATTORNEY

Nov. 3, 1953 H. F. SILVER 2,658,010
DOUBLE ROTARY DIFFUSION BATTERY
Filed Feb. 7, 1950 7 Sheets-Sheet 7

INVENTOR.
Harold F. Silver
BY
ATTORNEY

Patented Nov. 3, 1953

2,658,010

UNITED STATES PATENT OFFICE 2,658,010

DOUBLE ROTARY DIFFUSION BATTERY

Harold F. Silver, Denver, Colo.

Application February 7, 1950, Serial No. 142,910

11 Claims. (Cl. 127—6)

This invention relates to multiple stage diffusion apparatus providing for the generally countercurrent flow of solids and liquids through the apparatus with concurrent flow through the separate stages thereof, and further providing novel means for the separation of solids and liquids at each stage before introduction into the next successive stage to prevent contamination of liquids of one concentration or density with liquids of different densities or concentrations.

Previously many different types of diffusion apparatus have been designed and built. In general more recent types of diffusion apparatus provide for the concurrent travel of solids and liquids through the separate stages, though the countercurrent characteristics of prior forms of diffusion apparatus are maintained for travel through the entire apparatus. Where a concurrent and countercurrent flow pattern is utilized it is necessary to provide means for concurrently moving the solids and liquids through the treatment zones and transfer mechanisms which will separate the solids from the liquid in one stage before passing the solids into the liquid in the next adjacent stage. The efficiency of the extraction process is in large measure dependent on the arrangement and operation of these two mechanisms inasmuch as diffusion is largely dependent upon two factors. The first factor is the duration of time during which the solid particles are in contact with the liquid. The present day concurrent movement of solids and liquid through each of the separate stages has in general been adopted to provide for the increased contact time which is necessary to the complete removal of the soluble materials from the solid. Another important factor in a multiple stage diffusion process is the differential in the concentration of the soluble materials between the solids and the liquid. Where the differential is great and where the contact time is of sufficient duration, maximum extraction is possible. In order to maintain a sufficient differential in the concentration of solubles, it is necessary to prevent the intermixture of liquids of one concentration or density with liquids of an increased or decreased density.

Where the solids are being moved from one stage having a characteristic density for the liquid into an adjacent stage having a lesser liquid density, a certain amount of the liquid from the first stage is entrained with the solids during their movement into the second stage. This entrained liquid tends to increase the density in the second stage, thereby decreasing the efficiency of the extraction process in that second stage. Since this is an undesirable result it is important that the solid materials are drained to such an extent as to prevent undue contamination of the liquid in the second stage with that of the first. Accordingly, it is imperative that the transfer mechanism used is of an efficient design. Likewise since the draining of the liquid away from the solids before transfer into the next stage is also a function of time, there should be sufficient elapsed time with adequate provision for draining between the instant when the solids are first moved out of contact with the liquid and the successive instant when the solids are moved into the next stage. The present invention is intended to increase the efficiency of the diffusion process by providing apparatus which balances the requirements for contact time and drainage so as to obtain optimum extraction conditions.

In satisfying these conditions the present inventor has devised diffusion apparatus which is intended to satisfy the following objectives:

To provide apparatus for carrying out a continuous diffusion process in which separate mechanisms are provided for intermixing the solids and liquids during their period of contact and for separating the solids and liquid before transferring the solids into the next successive stage.

To provide novel means for elevating, draining and moving pulp materials from one treatment stage into the next successive stage.

To provide a transfer mechanism for diffusion apparatus which will allow for an increased solids draining time before the solids are moved into the next stage.

To provide a rotating wheel type of transfer mechanism for continuous diffusion apparatus.

To provide buckets for a rotating wheel type of transfer mechanism which are formed to readily receive solid materials when in a lowered position for elevation to an automatic dumping position after the solids have been drained of their liquid content.

To provide a novel arrangement for solid and liquid intermixing mechanisms and solid elevating mechanisms at separate stages of continuous diffusion apparatus which may be interconnected to provide for the concurrent travel of solids and liquids through each separate stage with countercurrent movement through the apparatus.

To provide means for adjusting the liquid level in continuous diffusion apparatus as necessary to compensate for changes in treatment capacity of the apparatus.

To provide novel flume and weir control mechanisms for the accurate control of fluid flow through continuous diffusion apparatus.

Other objects and advantages of the present invention will be apparent from the accompanying description and drawings in which.

Briefly stated, the present invention provides continuous diffusion apparatus in which the liquids and solids are moved concurrently through substantially tube-shaped treatment zones by the rotary action of a ribbon type scroll. During such movement there is sufficient agitation and elapsed time to assure maximum contact between the liquids and solids so as to obtain efficient extraction of materials from the solids before the pulp and liquid are moved to the discharge end of the treatment zone. At the discharge end the tube interconnects with an enclosure housing a wheel type transfer mechanism having elevating buckets thereon which receive the liquids and solids being delivered from the treatment zone. As the transfer wheel is rotated the bucket members raise above the level of liquid in the enclosure and the excess liquid is drained through perforations in the bottom and sides of the bucket back into the pool of liquid. Continued elevation of the solids material provides for continued draining of the solids until an open end of the buckets is in registration with a discharge chute interconnecting the transfer wheel with the intake end of the next adjacent upstream treatment zone. In similar manner the liquid from the first treatment zone moves through the transfer mechanism enclosure and through a weir type control gate to the next successive downstream treatment zone to establish a countercurrent flow relation through the entire diffusion apparatus while maintaining concurrent flow through each of the treatment zones.

Figure 1:
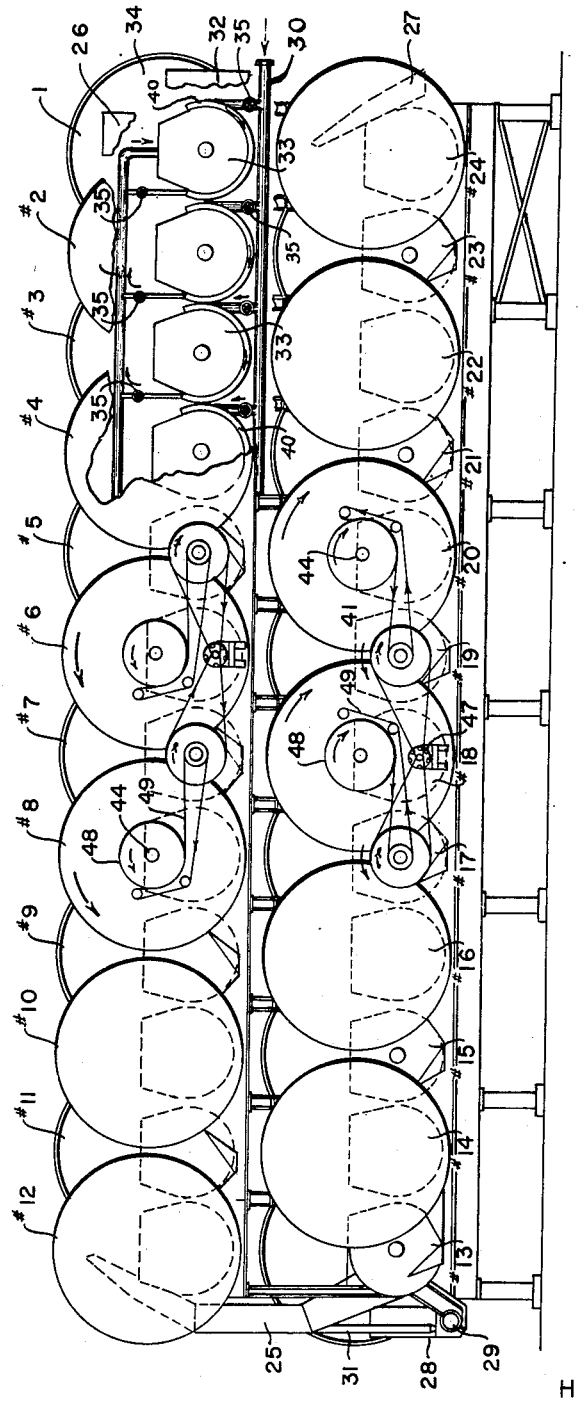
Fig. 1 is an elevation showing the over-all arrangement of treatment stages according to this invention.

The detailed features of this invention will be more fully understood in conjunction with the appended drawings in Fig. 1 of which an over-all arrangement of diffusion apparatus for the extraction of sugar liquor from prepared sugar beet cossettes is shown.

In Fig. 1 it will be noted that the diffusion apparatus is made up of a plurality of separate treatment stages, Nos. 1 through 24, interconnected in distinctive arrangement so that the cossettes introduced into the hopper 26 of treatment stage No. 1 pass successively through stages Nos. 1, 2, 3 etc. to stage No. 12 where they are discharged downwardly through the chute 25 for continued movement toward stage No. 24 and discharge chute 27. In similar manner water is introduced into stage No. 24 by means of pipes and conduits (not shown) for travel in a downstream direction countercurrent to the travel of cossettes through stages 24, 23, 22 and so forth into stage 13. After treatment in stage 13 the water which by then has a considerable sugar content is separated from the cossettes and received in a launder 28. A pump 29 is then used to elevate the liquid through the pipe 31 for discharge into the treatment cell of stage No. 12. From stage No. 12 the liquid again travels in a downstream direction toward stage No. 1 where the liquid with its heavy sugar content is discharged through launder 32 into conduits and receiving vessels (not shown) of the conventional sugar refinery.

As shown in Fig. 1, stages Nos. 1, 2, 3 and 4 are heated so as to improve the extraction from the cossettes passing through these stages. This desirable heating is carried out by means of steam conduits 30 interconnected through valves 35 with insulated heating jackets 40 formed around the separate treatment cells 33. The valves 35 are provided to control the amount of heat introduced into these stages in order to secure the desired operating conditions.

Figure 2:
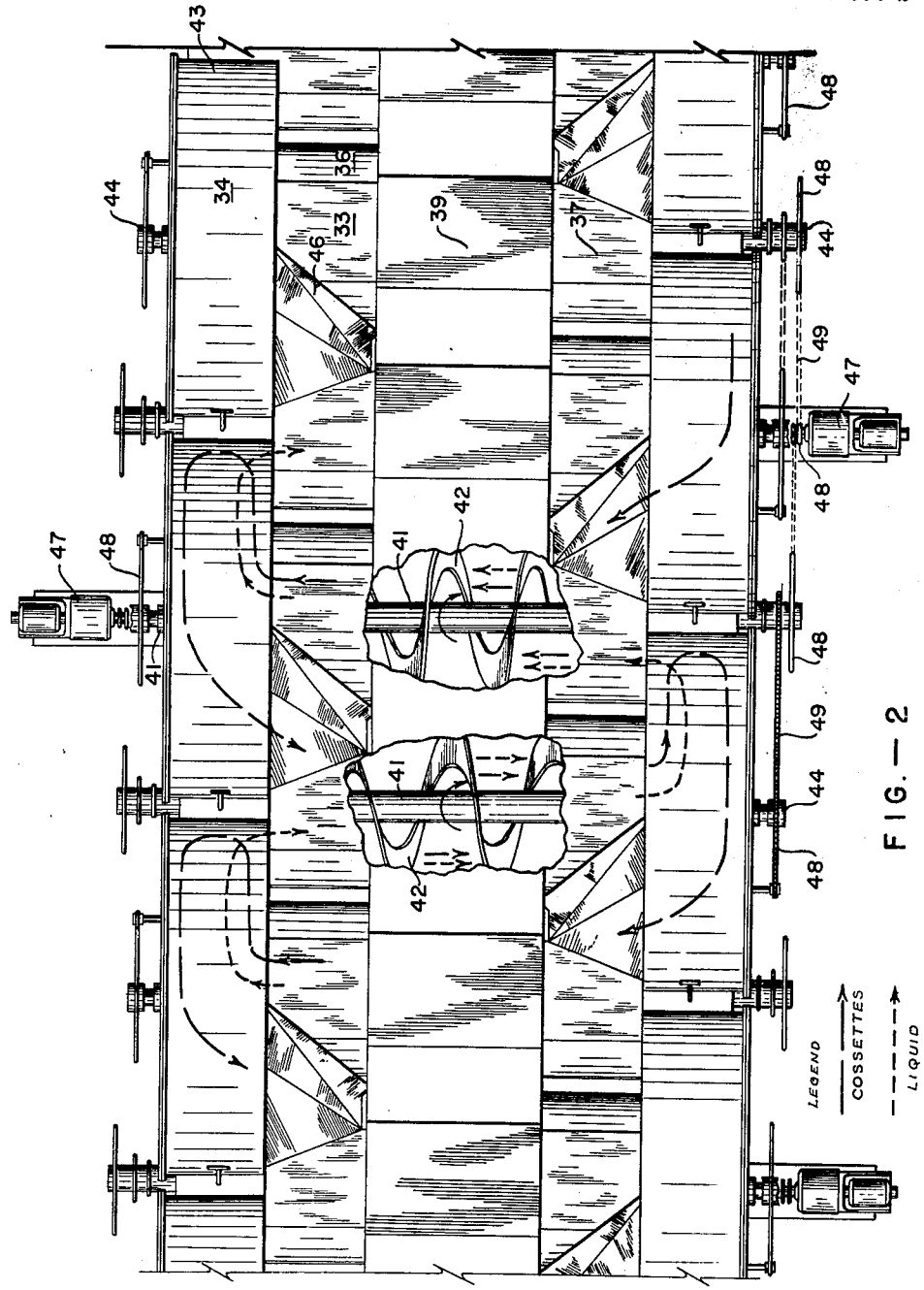
Fig. 2 is a top plan in partial section view showing the interconnecting features of the cells and transfer mechanisms.
Figure 3:
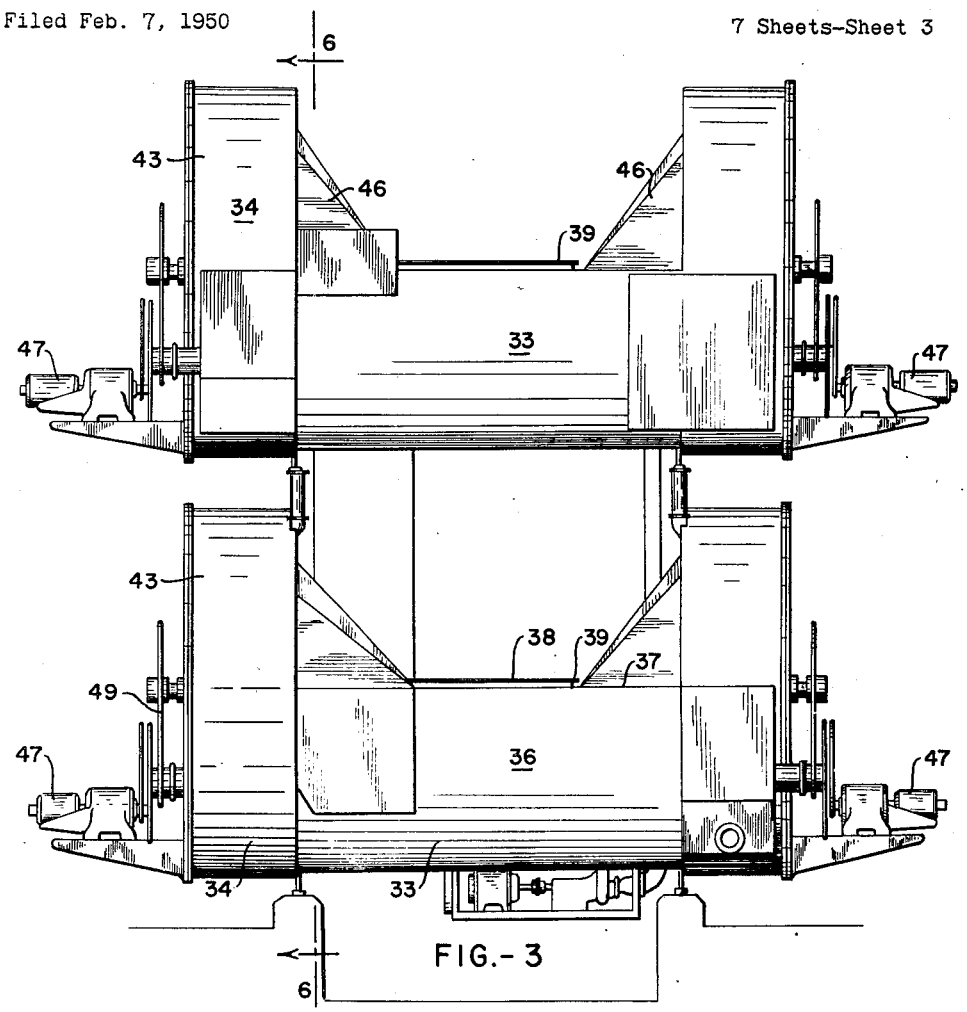
Fig. 3 is an end elevation further showing the assembled relation of apparatus according to this invention.

As better shown in Figs. 2 and 3, the treatment stages are made up of horizontally disposed treatment cells 33 which discharge into transfer mechanisms 34. The cells 33 are made up of tube sections 36 having rounded sides and bottoms and flat tops 37 which provide access openings 38 that are normally closed by flat covers 39. Shafts 41 having ribbon type scroll conveyors 42 secured thereto are disposed for rotation about horizontal axes through each of the treatment cells 33 so as to agitate and move the cossettes and liquid through the cells 33 as necessary to insure adequate contact between the liquid and cossettes. As indicated in Fig. 2 each of the shafts 41 rotates in the same direction. However the scrolls 42 are wound in opposite directions so as to move the materials in adjacent cells 33 in opposite directions as indicated by the dotted line flow patterns.

The transfer mechanisms 34 are all placed adjacent the discharge ends of the associated treatment cells 33 so that materials delivered through the cells 33 by the action of the scrolls 42 will be received within the enclosure 43 of the associated transfer mechanism 34. Wheel type elevators or conveyors are disposed within the enclosures 43 for rotation about the separate shafts 44 to elevate the cossettes received within the enclosures 43 out of the liquid therein so the cossettes may be delivered to the next adjacent upstream cell by means of interconnecting chutes 46 while the liquid is allowed to pass in a downstream direction to the next adjacent downstream cell.

As shown in Figs. 1 and 2 a drive motor 47 is interconnected by means of sprockets 48 and link chains 49 so that the single motor 47 rotates two separate scroll shafts 41 and two separate wheel shafts 44. It should also be noted that the scroll shafts 41 and wheel shafts 44 are so interconnected to the single motor 47 that the scroll shafts 41 are rotated at approximately four times the rate of rotation for the wheel shafts 44.

Figure 5:
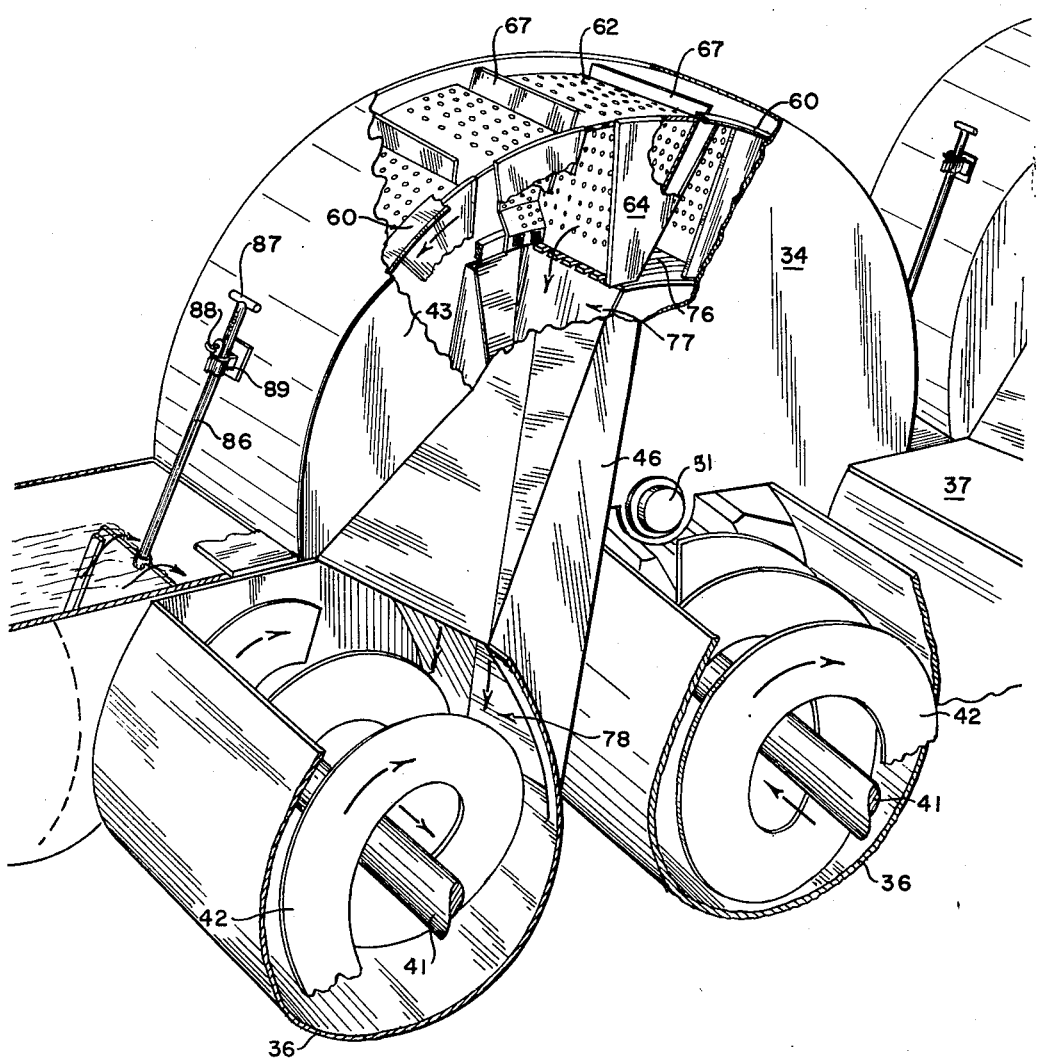
Fig. 5 is a perspective view in partial section showing the relation of assembled units of this invention.

The actual structure of the treatment cells 33 is best shown in Fig. 5 where it will be noted that the shaft 41 which supports the scroll 42 is disposed horizontally within the tube section 36 and its flat top 37 as indicated. Adequate clearance is maintained between the outer edge of the scroll 42 and the tube section 36 to prevent undue mashing and destruction of the cossettes being moved through the cells 33. Likewise the scroll 42 is so designed as to maintain adequate agitation in the cell 33 as necessary to assure the desired contact between the cossettes and the liquid without causing destruction of the cossettes.

Figure 4:
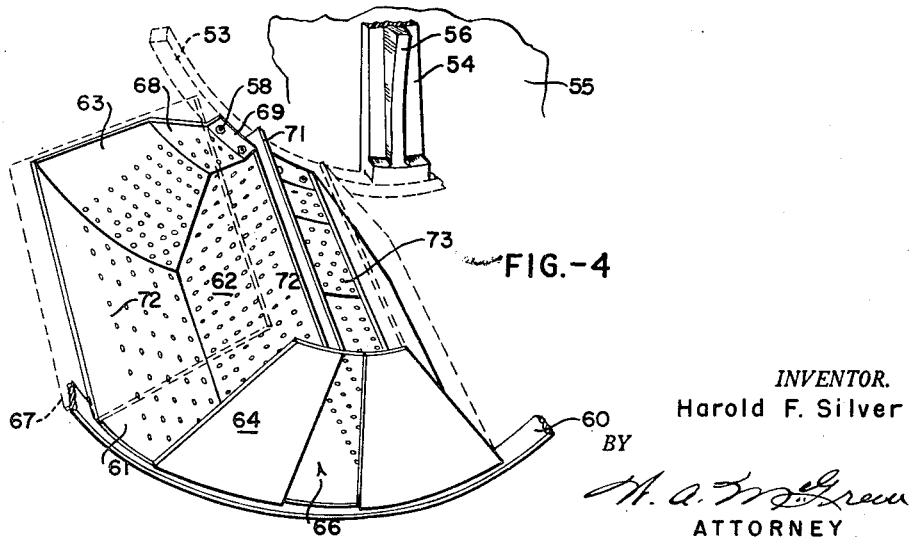
Fig. 4 is a partial perspective view showing the detailed features of the elevating buckets of the transfer mechanism.
Figure 7:
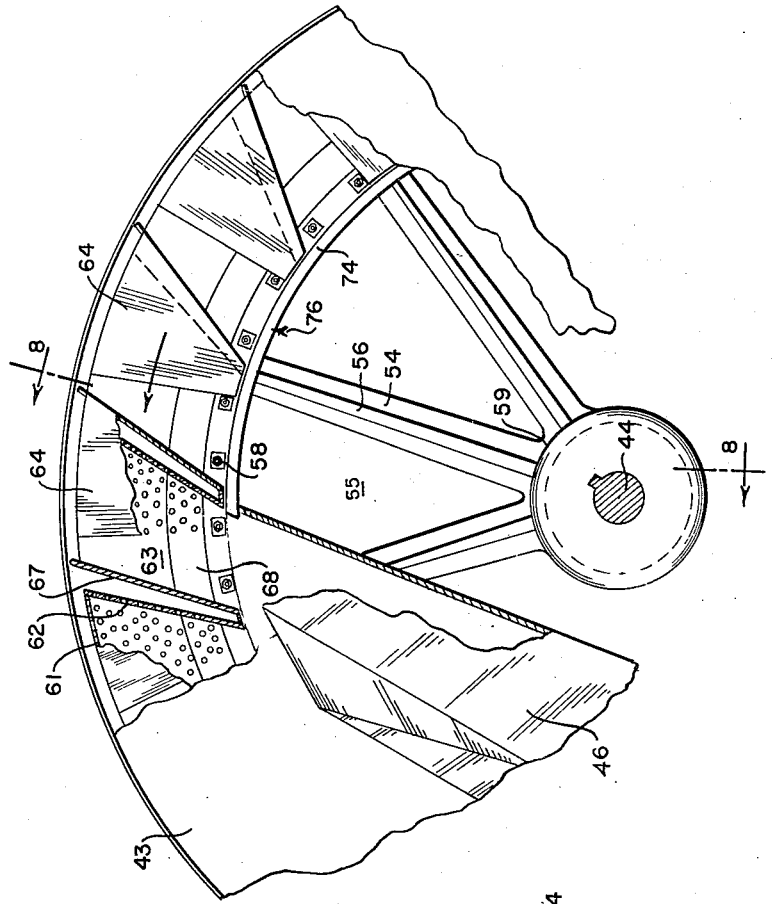
Fig. 7 is an elevation in partial section further showing the detailed features of the transfer mechanism of this invention.
Figure 8:
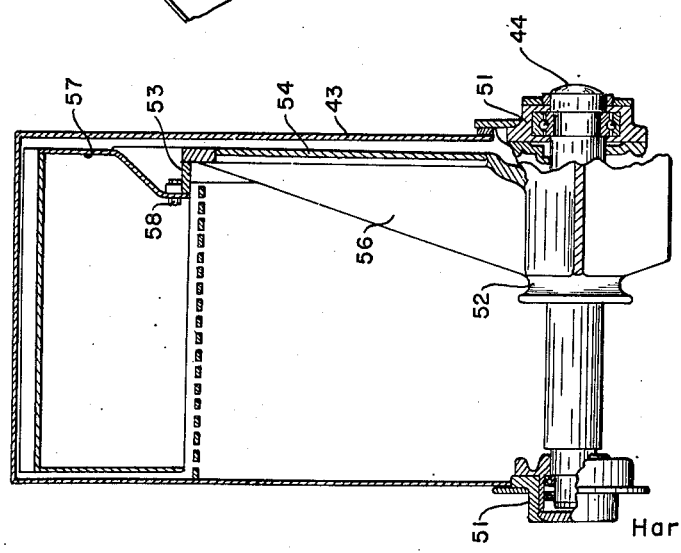
Fig. 8 is a cross sectional elevation taken along the line 8—8 of Fig. 7.
Figures 9, 10:
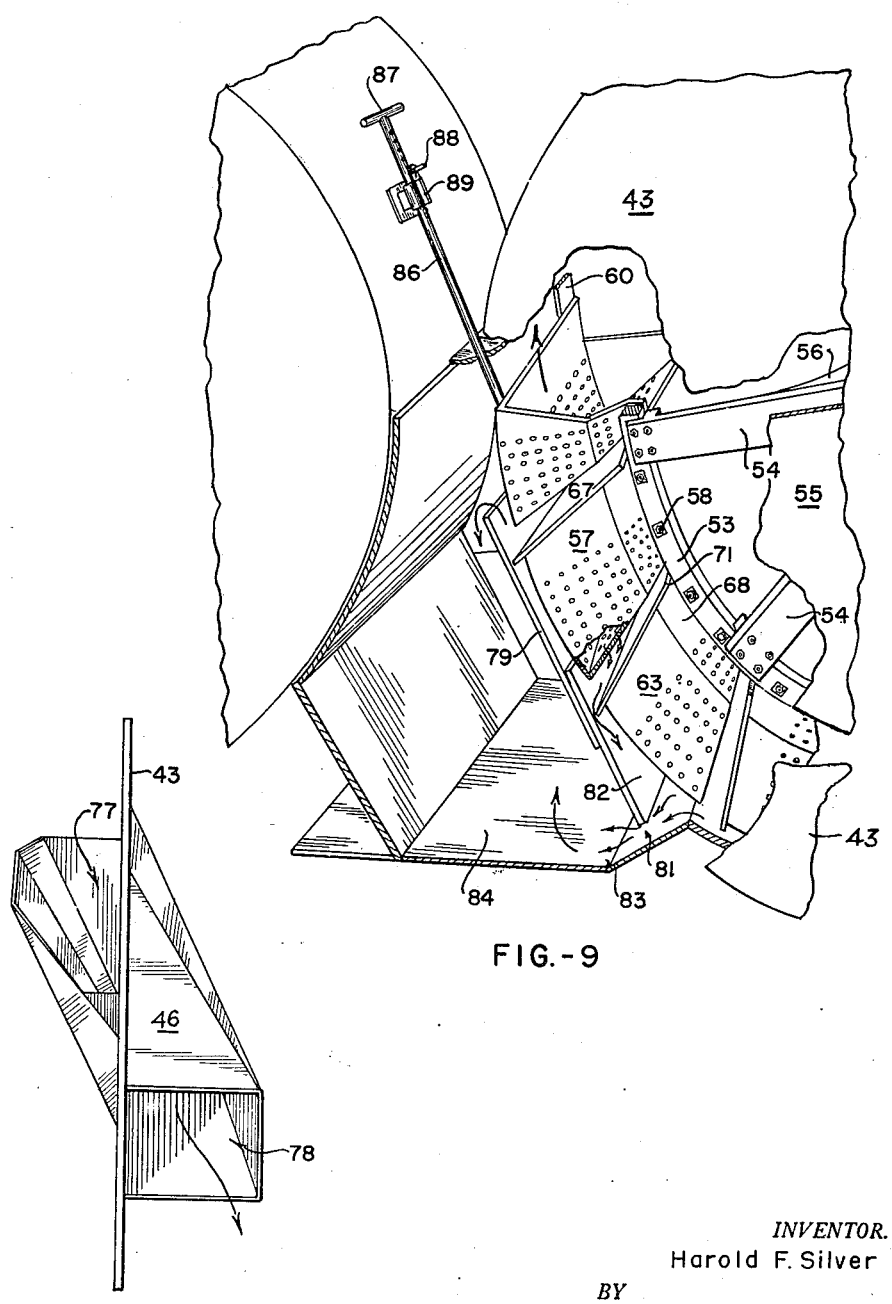
Fig. 9 is a perspective view showing details of the wheel type transfer mechanism and the liquid level controlling weir.
Fig. 10 is a detailed elevation showing the shape and configuration of a transfer chute interconnecting the solids elevating wheel and the treatment cells.

The structure for the wheel type transfer mechanism is best shown in Figs. 7 and 8 where it will be noted that the shaft 44 is journalled in bearings 51 which are supported by the enclosure 43. A hub 52 is disposed on the shaft 44 for rotation therewith and the hub 52 is interconnected with an outer circular bucket support rim 53 by means of spider members 54 having an inwardly disposed strengthening web 56. A circular splash plate 55 as shown in Figs. 4, 7 and 9 is provided to close off the spaces between the spider members 54. Separate buckets 57 are attached by means of bolts 58 to the rim 53 of the wheel type support 59 made up of the hub 52 and the web members 54. Additional supports which are not shown in the drawings for purposes of clarity are provided to maintain the buckets 57 in cantilever position with respect to the wheel rim 53.

The shape of the buckets 57 is of considerable importance to the operation of the transfer mechanisms 34. Accordingly the detailed structural features of the bucket are rather fully set forth in Figs. 4, 5, 7, and 9. These detailed features are most clearly shown in the perspective drawing of Fig. 4. Here it will be noted that the buckets 57 are made up of a curved bottom plate 61 secured to a back plate 62 and side plates 63 and 64. The side plate 64 which is disposed toward the treatment cells 33 is formed to provide an opening 66 into the interior of the bucket so that cossettes and liquid may be moved from the discharge end of the treatment cells 33 through the opening 66 and into the interior of the rotating buckets 57. The side plate 63 is interconnected with the bottom 61, the back plate 62 and a forwardly disposed pumping plate 67 of rectangular shape. Since the side plate 63 is provided with an angular section 68 disposed inwardly toward the center of the bucket and a flange 69 thereon adapted to receive the bolts 58, a corner 71 of the pumping plate 67 will extend beyond the angular portion 68 of the side plate 63. This corner 71 of the pumping plate 67, because of its placement, tends to agitate the liquid received in the transfer mechanism enclosure 43 so as to prevent the building up of stagnant areas within the transfer mechanism 34 while also providing, together with the rest of the pumping plate 67, a pumping action which tends to move the separated liquid toward its point of discharge from the transfer mechanism. In so far as the pumping action is concerned the lip portion of the plate 67 which extends outwardly beyond the curved bottom 61 is likewise of special importance. To prevent the solids from intermixing with the liquid a seal ring 60 as shown in Figs. 4, 5, 7 and 8 is provided to encircle the inner edge of the buckets 57. This seal ring 60 rotates with the wheel 59 and allows a minimum clearance between the wheel and the enclosure 43.

In order that the cossettes that are received in the bucket 57 may be drained before they are transferred into the next adjacent upstream cell, the bottom 61, back plate 62 and side plate 63 are provided with a plurality of perforations 72. These perforations are arranged in a distinctive pattern so that the forward portions of the bottom 61 and the side plate 63 are imperforate to prevent the inflow of liquid when this portion of the bucket 57 first travels below the liquid level in the transfer mechanism 34. The prevention of inflow or backflow of liquid provides more space in the buckets 57 for the entry of the solids and liquid mixture instead of allowing the buckets to fill solely with liquid.

Because if the cantilever type mounting of the buckets 57 with respect to the wheel 59 and rim 53, there is provided a large central opening between the circumferentially positioned buckets 57 and within the enclosure 43. Since the upper end of the buckets 57 is open between the back plate 62, the side plates 63 and 64, and the pumping plate 67, rotation of the buckets in an upward direction would ordinarily cause movement of the cossettes from a pisition of rest along the bottom 61 in a tumbling action across the back plate 62 toward the opening 73 in the top of the bucket 57. When the bucket 57 was sufficiently elevated, the cossettes received in the bucket would be dumped into the large open space in the center of the wheel. In order to prevent this dumping action, a plurality if curved bars 74 are arranged in parallel position to form a circular grid or grizzly 76 over which the open ends 73 of the buckets 57 pass. Since there is but slight clearance between the grizzly 76 and the passing buckets 57, the cossettes that are dumped out of the bucket by the rotating elevation of the bottom 62 will be received on the grid 76 and will be moved up the curvature of the grid 76 by the impelling force of the wheel and back plate 62.

As shown in Fig. 7 the grid 76 is terminated at a position substantially vertically above the shaft 44. As the cossettes are moved to this point they are allowed to fall freely into the open end 77 of the transfer chute 46. The transfer chute 46 is itself so formed that the passage therethrough interconnects the upper open end 77 and an opening 78 in the side 36 of the cells 33.

The exact form and structure for the chute is shown in Fig. 10 where it will be noted that the passage through the chute is completely enclosed externally of the enclosure 43 so that foreign materials will not be introduced into the treatment cells. Interiorly of the enclosure 43 the upper face of the chute is open so that cossettes which adhere to the bucket 57 for a short time after passing the open end 77 will still be received in the chute 46. Another advantage is inherent in the inclination of the chute 46 and the positioning of the chute discharge opening 78 inasmuch as these cooperate with the rotating scroll 42 to force the cossettes downwardly into the liquid in the cell so that the liquid and solids will be brought into immediate contact to effect a maximum extraction during the period of movement through the treatment cell.

Figure 6:
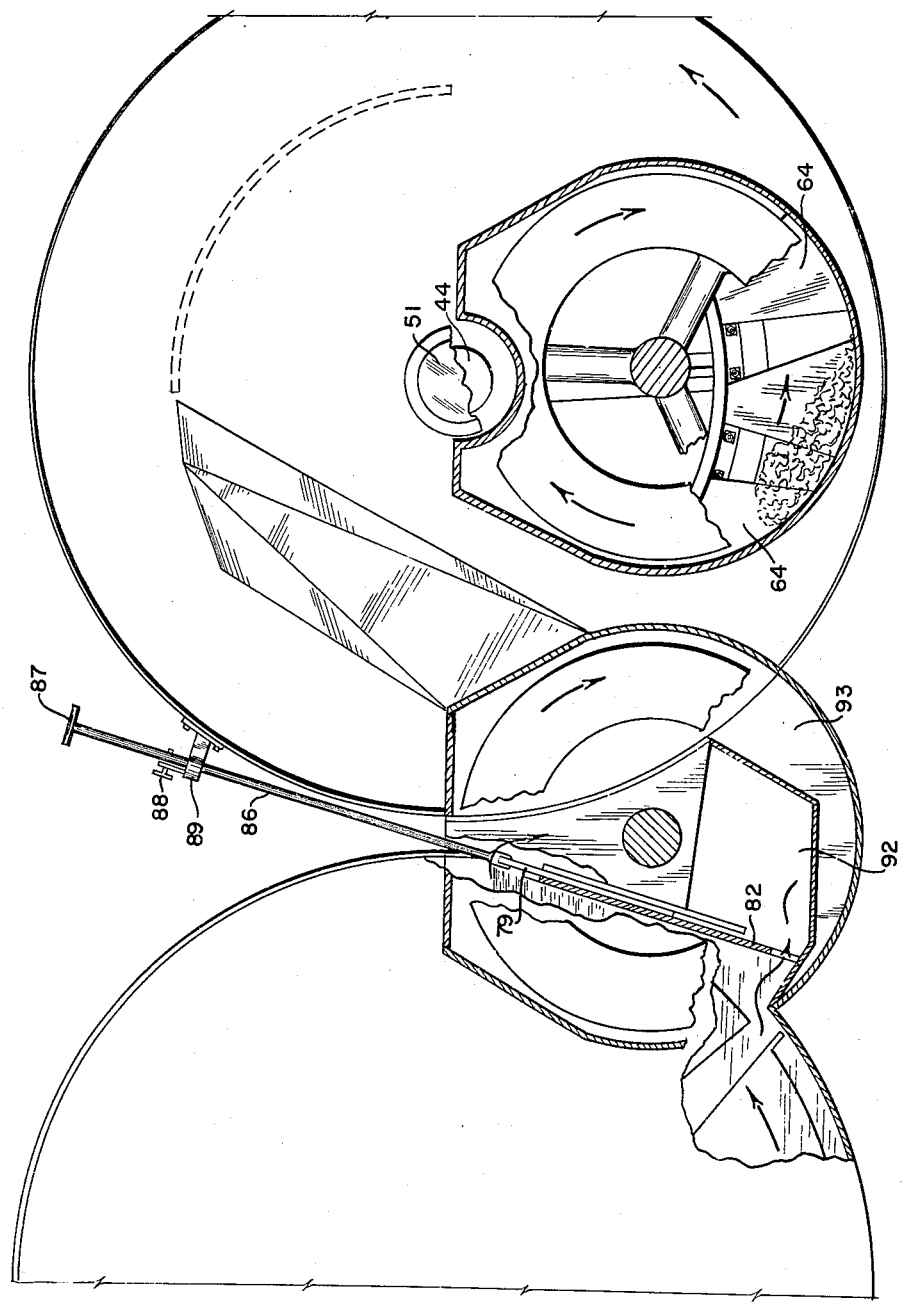
Fig. 6 is an elevation taken along the line 6—6 of Fig. 3 showing features of this invention.

The movement of liquid through the transfer mechanism and into the cells is best shown in Figs. 5, 6 and 9. As illustrated in Fig. 6 the liquid level in the treatment cells 33 and in the transfer mechanism 34 is usually maintained at an elevation just below the shaft 44. Since the level of liquid in the treatment cells 33 is at approximately the same height and since the rotary motion of the scroll 42 tends to move the liquid and the cossettes toward the transfer mechanism 34, the liquid in the cells 33 will move together with cossettes into the enclosure 43. When received in this enclosure the liquid will be subjected to the pumping action coincident with the rotation of the wheel 59 and the buckets 57. The pumping plate 67 will itself tend to cause the liquid level to be raised adjacent a discharge side of the wheel so as to move a quantity of liquid over the top of an adjustable weir 79 positioned at the downstream side of the transfer mechanism 34. In addition a minor quantity of liquid will be allowed to escape from the enclosure 43 through an opening 81 between a permanent weir plate 82 adjacent weir 79 and the bottom 83 of a receiving launder 84 positioned between the transfer mechanism enclosures 43. Primarily the opening 81 is provided to prevent the building up of stagnant quantities of cossettes and liquid in the bottom of the enclosure 43. However, this opening also provides for the complete draining of all of the cells 33 and transfer mechanisms 34 when it is desired to close down the diffusion process. For some installations the opening 81 will not be necessary. Accordingly it is to be understood that the opening may be used or omitted as desired.

Since the position of the adjustable weir 79 may be varied by adjusting the position of a control rod 86 which is connected to the weir 79, the liquid level in the transfer mechanism and in the separate treatment stages may be adjusted as desired. When the weir 79 is raised by grasping the handle 87 and the control rod is subsequently secured in its newly adjusted position by means of the pin 88 which bears against a supporting guide bracket 89, the level of liquid in the treatment stages will be raised and accordingly the capacity of the diffusion apparatus will be increased. Likewise when the liquid level is lowered the treatment capacity of the diffusion apparatus is decreased. Since prior types of diffusion apparatus in general depended upon changing the speed of the diffusion apparatus to effect changes in the treatment capacity the provision of an adjustable weir which permits the treatment of variable quantities of material at an optimum rate represents a marked improvement. Inasmuch as changes in capacity are no longer dependent on a change in the total elapsed treatment time the deleterious effects coincident with overly extended treatment such as oxidation and fermentation are eliminated.

As shown in Fig. 6 the liquid received in the launders 84 passes directly through a trapezoidally shaped opening 92 in a plate 93 interconnecting the adjacent enclosures 43 directly into the receiving end of a downstream treatment cell 33 where it is intermixed in the next stage, as previously described, with the cossettes introduced at the same end through the opening 78. The circuit thus completed provides concurrent flow of cossettes and liquid through each of the treatment cells 33 and countercurrent flow away from each of the transfer mechanisms 34 in such a manner as to satisfy the requirements for increased contact time and proper maintenance of concentration differentials. Accordingly the diffusion process carried out in the described apparatus is highly efficient and economical.

Though the apparatus has been described in conjunction with a sugar extraction process it will be obvious that other similar processes could well be carried out in the same apparatus. Likewise it will be obvious that the described apparatus is adaptable to various modifications and changes. All such modifications and changes as are within the scope of the hereunto appended claims are deemed to be a part of this invention.

What is claimed is:

1. Continuous diffusion apparatus for the treatment of divided solids materials in liquid comprising a plurality of treatment cells having at least one inlet opening at a first end for the introduction of liquid and divided solids and at least one outlet opening at an opposite end of each said cell for the discharge of treated products, discharge receiving enclosures at the discharge end of said cells, rotary conveyor mechanisms adapted to elevate the solids in said enclosures away from the liquid, a plurality of conduit members interconnecting adjacent cells adapted to receive the solids from said conveyor mechanisms and deliver the solids into the inlet openings in adjacent cells, launders interconnecting adjacent enclosures arranged to provide gravity-flow passageways for the separated liquid, an adjustable weir member positioned in each said launder for regulating the gravity flow of liquid through said launders, and pumping plates mounted for conjoint rotation on said conveyor mechanisms for raising the liquid level in said enclosures above the level of said weirs to assure passage of liquid from a first enclosure to the inlet of the next adjacent downstream cell.

2. In continuous diffusion apparatus for the treatment of divided solids materials and liquid in a plurality of treatment stages of different liquid density, transfer mechanisms for elevating the solids out of the liquid in each treatment stage, comprising a wheel type structure rotatably mounted for movement through the liquid, a plurality of bucket members attached to said wheel structure at the outer periphery thereof having discharge openings disposed toward the center of said wheel, means for rotating said wheel to elevate the solids materials received therein, a grid member disposed centrally of said wheel in near contact with said buckets for preventing the escape of solids out of said discharge openings in the buckets as the buckets are elevated, and a chute member positioned adjacent a terminal edge of said grid member adapted to receive and deliver the elevated solids to an adjacent treatment stage.

3. In continuous diffusion apparatus for the treatment of divided solids materials and liquid in a plurality of treatment stages of different liquid density, a transfer mechanism for elevating the solids out of the liquid in each treatment stage comprising a bottom plate having a plurality of openings therein, a back plate having a plurality of openings therein joined to said bottom plate, a forwardly disposed pumping plate joined at a position intermediate of its width to said bottom plate, a first side plate having a plurality of openings therein joining said back, bottom and pumping plates, a second side plate joining said back and bottom plates providing an opening for the introduction of solids materials, said plates completing a bucket-type receptacle having a top discharge opening, and a bucket support structure for movement through the liquid and solids in the treatment stages as necessary to elevate and drain the solids received in said buckets.

4. In continuous diffusion apparatus in which divided solids material and a liquid are passed progressively through a series of cells in generally countercurrent flow with concurrent flow in each cell, the combination comprising: a horizontally disposed elongated cell having an inlet and an outlet end; conveyor means in said cell for moving solids material from said inlet end to said outlet end; a compartment at said outlet end; a transfer wheel mounted in said compartment for rotation about a horizontal axis above, parallel to, and disposed in a substantially vertical plane including, the longitudinal axis of said cell; a plurality of foraminous containers on said wheel for receiving and elevating the solids material and discharging the same adjacent the maximum elevation thereof, the diameter of said wheel being substantially greater than the depth of said cell whereby said containers elevate the solids material substantially above the liquid level in said cell for draining the solids material; a chute for receiving solids material discharged from said containers and for conducting the material into the inlet end of an adjacent cell; and means for conducting drainage liquid from a predetermined level in said compartment to the inlet end of another adjacent cell.

5. The structure defined in claim 4 in which the conveyor means comprises a rotary helix and including means for rotating said helix and the transfer wheel at differential speeds with said wheel rotating considerably slower than said helix.

6. The structure defined in claim 4 in which the axis of rotation of the wheel is located at about the maximum liquid level of the cell.

7. The structure defined in claim 4 in which the drainage liquid conducting means includes a weir in the compartment for flow of drainage liquid thereover in its passage to the said another adjacent cell, and including peripheral pumping plates on the wheel for elevating liquid in said compartment over said weir.

8. The structure defined in claim 4 in which the drainage liquid conducting means includes a vertically adjustable weir in the compartment for flow of drainage liquid thereover in its passage to the said another adjacent cell, and including means for adjusting said weir.

9. The structure defined in claim 4 in which each container has a side open toward the axis of the wheel and including stationary grid means for retaining solids material in each said container until about the maximum elevation thereof.

10. In continuous diffusion apparatus in which divided solids material and a liquid are passed progressively through a series of cells in generally countercurrent flow with concurrent flow in each cell, the combination comprising: a plurality of parallel horizontally disposed elongated cells, each having an inlet and an outlet end; conveyor means in said cells for moving solids material from their inlet to their outlet ends; a compartment at the outlet end of each said cell; a foraminous - bucket - carrying transfer wheel mounted for rotation about a horizontal axis in each said compartment for receiving, elevating and draining, and transferring solids material to an adjacent cell, the axis of rotation of each said wheel being above the longitudinal axis of its corresponding cell and the diameter of each said wheel being greater than the depth of its said corresponding cell; a vertically adjustable weir in each said compartment positioned closely adjacent the periphery of the said wheel therein for overflow of drainage liquid over said weir in its passage to another adjacent cell; means for separately adjusting said weirs; pumping plates on each said wheel for elevating drainage liquid over the corresponding said weir; and means for conducting liquid flowing over each said weir to said other adjacent cell.

11. The structure defined in claim 10 in which the bottom of each compartment is below the bottom of the corresponding cell and including means defining lower openings from each compartment above the bottom thereof and below the weir therein for passage of a minor quantity of liquid therethrough to the liquid conducting means.

HAROLD F. SILVER.

References Cited in the file of this patent

UNITED STATES PATENTS

| Number | Name | Date |
|---|---|---|
| 755,546 | Rak | Mar. 22, 1904 |
| 1,006,311 | Steffen | Oct. 17, 1911 |
| 1,523,277 | Olier | Jan. 13, 1925 |
| 2,390,131 | Silver | Dec. 4, 1945 |
| 2,468,720 | Silver | Apr. 26, 1949 |
| 2,505,716 | Morton | Apr. 25, 1950 |
| 2,548,996 | Morton | Apr. 17, 1951 |

FOREIGN PATENTS

| Number | Country | Date |
|---|---|---|
| 510,642 | France | Sept. 10, 1920 |